United States Patent [19]

Wade

[11] Patent Number: 4,777,656
[45] Date of Patent: Oct. 11, 1988

[54] LEGISLATED EMERGENCY LOCATING TRANSMITTERS AND EMERGENCY POSITION INDICATING RADIO BEACONS

[75] Inventor: William R. Wade, Waltham, Mass.

[73] Assignee: The United States of America as represented by the Administrator of the National Aeronautics and Space Administration, Washington, D.C.

[21] Appl. No.: 655,606

[22] Filed: Sep. 28, 1984

[51] Int. Cl.⁴ ............................................. H04B 1/034
[52] U.S. Cl. ...................................... 455/98; 455/67; 455/115; 455/117
[58] Field of Search ....................... 455/67, 95, 96, 98, 455/99, 115, 117

[56] References Cited

U.S. PATENT DOCUMENTS

| | | | |
|---|---|---|---|
| 3,553,587 | 4/1967 | Aass | 455/96 |
| 3,701,945 | 10/1972 | Gallant | 455/53 |
| 3,737,782 | 6/1973 | Pierce | 455/115 |
| 4,088,948 | 5/1978 | Miedema | 455/67 |
| 4,418,426 | 11/1983 | Singletary | 455/127 |

Primary Examiner—Michael A. Masinick
Attorney, Agent, or Firm—R. Dennis Marchant; John R. Manning; Ronald F. Sandler

[57] ABSTRACT

An emergency locating transmitting (ELT) system comprising a legislated ELT modified with an interface unit and connected by a multiwire cable to a remote control monitor (RCM), typically located at the pilot position. The RCM can remotely (1) test the ELT by disabling the legislated swept tone and allowing transmission of a single tone, (2) turn the ELT "on" for legislated ELT transmission, and (3) reset the ELT to an "armed" condition. The RCM also provides visual and audio indications of transmitter operating condition as well as ELT battery condition. Removing the RCM or shorting or opening the interface input connections will not affect traditional ELT operation.

17 Claims, 5 Drawing Sheets

LEGISLATED EMERGENCY LOCATING TRANSMITTERS AND EMERGENCY POSITION INDICATING RADIO BEACONS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

TECHNICAL FIELD

This invention pertains generally to distress signal beacon devices such as emergency locating transmitters (ELTs) and emergency position indication radio beacons (EPIRBs) and, more particularly, to ELTs and EPIRBs with means to ensure intended operation and further means to ensure intended disablement.

BACKGROUND ART

There are presently in existence in the United States approximately 190,000 emergency locating transmitters (ELTs) required by law on all small aircraft traveling more than twenty-five miles from an airport and about 6,000 emergency position indicating radio beacons (EPIRBs) required on certain classes of marine vessels. ELTs and EPIRBs are essentially the same device which transmits an audio tone on 121.5 MHz and 243 MHz indicating that a distress incident has occurred. In general, the ELTs are activated by aircraft impact whereas the EPIRBs are activated in response to contact of the EPIRBs with water. The audio output generated by these devices is a characteristic distress signal which is produced by a modulation waveform having a downward sweep of at least 700 Hz within a band of 1,600 Hz and 300 Hz at a rate of 2 Hz to 4 Hz. These specifications are predetermined by legislation so that the required transmitted signals may be recognized by individuals listening for the characteristic distress signal on the 121.5 MHz and 243 MHz carrier frequencies. The Air Force Rescue Coordination Center (AFRCC), for example, receives information from others, i.e., FAA flight service stations, airports, Civil Air Patrol, etc., who monitor the 121.5 MHz and 243 MHz carrier frequencies and it responds to distress signals by notifying search and rescue personnel (SAR), such as the Civil Air Patrol, to search for the location of the distress transmission and initiate rescue operations.

While these distress signal devices have been employed for some period of time and with some degree of success, some problems have surfaced with respect to these devices in terms of their reliability. These problems can be generically divided into two categories, one category being a failure of the device to operate when operation is intended and the other relating to its operation when operation is not intended, i.e., false alarms. Furthermore, traditional, legislated ELTs and EPIRBs do not provide any indication to the pilot or other operator as to whether the device is ready for activation or, on the other hand, whether the device is activated and producing a false-alarm signal.

STATEMENT OF THE INVENTION

Accordingly, it is an object of this invention to improve ELT and EPIRB reliability.

It is another object of the invention to reduce ELT and EPIRB false alarms.

It is yet another object of the invention to provide a pilot or other operator with a means for monitoring ELT and EPIRB operating condition.

It is still another object of the invention to provide a pilot or other operator with a means for controlling ELT and EPIRB operating condition.

Briefly, these and other objects are achieved in a distress signal beacon system including remote means for indicating if the beacon is armed, i.e., ready to signal the detection of a crash when the aircraft power is turned on, remote means for indicating when the beacon is transmitting, remote reset means, i.e., means to turn off the transmitter and return the beacon to the armed state, and means to transmit a non-distress signal with a steady audio tone when the beacon is being tested. Additionally, a remote control monitor (RCM) is provided in the cockpit (for an ELT version) which is connected to an ELT by means of a multiconductor electrical cable and interface circuitry. In accordance with the invention, the RCM can be removed and/or the cable wires shorted or open circuited without affecting the operation of the ELT.

DETAILED DESCRIPTION OF THE DRAWINGS

Figure 1:
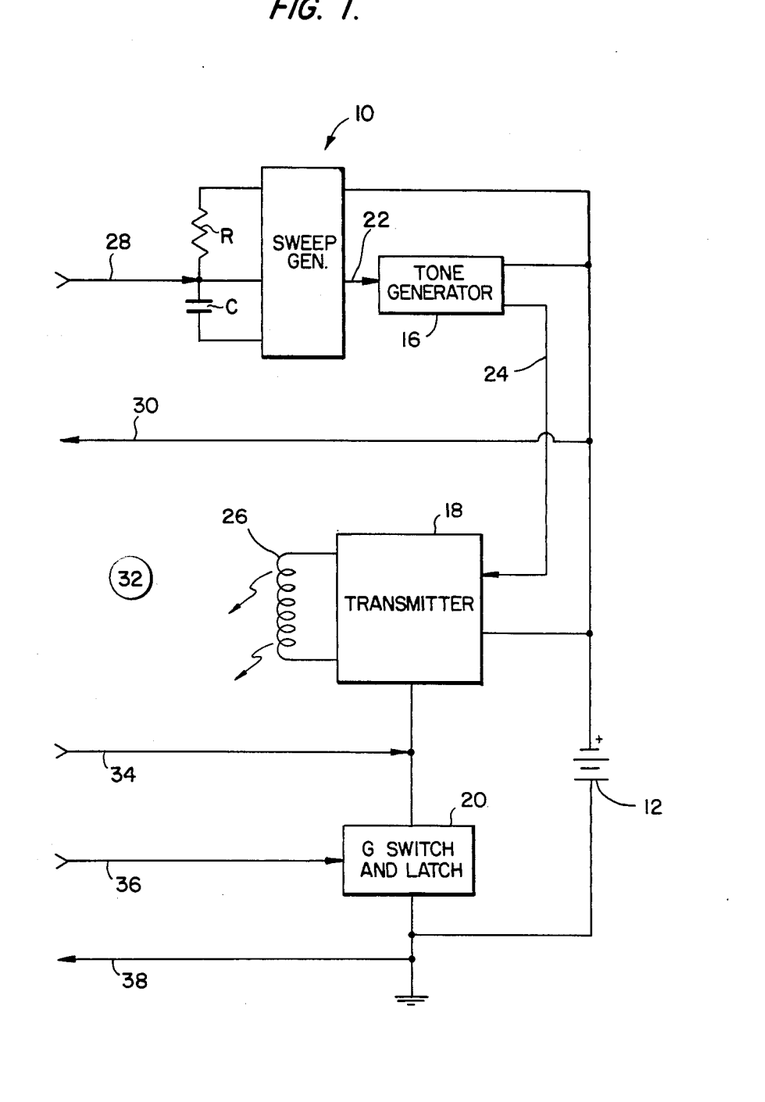
FIG. 1 is a block diagram representation of a standard, legislated ELT.

Reference is now made to the drawings and, in particular, to FIG. 1, where a standard ELT 10 is generally represented in a block diagram format. The positive terminal of a 12V battery 12, provided separately for and internal to the ELT, is connected to sweep generator 12, tone generator 16 and transmitter 18. The negative (ground) terminal of the battery 12 is connected to one side of normally open G-switch (and mechanical latch) 20. G-switch (and latch) 20 has no requirement to be electrically energized. The sweep generator 14, connected to tone generator 16, provides a control signal 22, which may typically be a sawtooth waveform, for controlling the frequency of the tone generator. In turn, the output 24 of the tone generator 16, connected to transmitter 18, is generally a square wave with a legislated 700 Hz bandwidth of decreasing frequency between 300 Hz and 1600 Hz. The tone generator output 24 is directly applied to transmitter 18 to amplitude modulate the transmitter r.f. carrier frequencies which are legislated at 121.5 MHz and 243 MHz. Antenna 26 is driven by the transmitter and is generally omni-directional. The basic control for turning the transmitter "on" is through switch 20. The positive terminal of dedicated battery 12 is continuously connected to the ELT circuitry but the negative terminal of the battery is normally not connected to the circuitry. The ground connection for the circuitry is typically furnished through switch 20. When a sufficient, predetermined force is applied to the switch due to de-acceleration, the switch closes. If the switch is the mechanically latching type, the contacts remain in the closed position, keeping the electrical connection closed and grounding the battery to the circuit ground connection points (not shown except for the transmitter) and permitting operation of the ELT. If the G-switch is of the momentary contact type, i.e., electrically latched, closure of the contacts turns on a silicon controlled rectifier which acts as an electrical latch to keep the ELT transmitting.

In a broad sense, problems with current generation ELTs relate to the generation of false alarms, i.e., the transmitter is firing without the occurrence of a distress incident, or the failure to transmit when a distress incident has occurred. False alarms are generally associated with switch 20 closing and remaining in the latched position when it should not be closed. On the other hand, the failure problem is very often associated with the switch failing to close when it should or the failure of battery 12. Accordingly, it would be advantageous if the pilot, or other operator, could be continually informed of the ELT operating condition and make corrections in the event of any malfunction. This is made somewhat more difficult because the typical ELT location is in the tail section of the aircraft. The instant invention provides ELT operating information and the capability for taking corrective measures at a position which is remote from the ELT. This is accomplished by providing certain access points in the standard ELT for connection to an interface circuit (depicted in FIG. 2) in the ELT package itself and connecting the interface to a remote control monitor (RCM) which monitors ELT operating condition and provides certain test functions at the pilot or other operator position. These access points are identified in FIG. 1 (and FIG. 2) as numbers 28, 30, 32, 34, 36, and 38.

Point 28 is shown connected to an R-C network which provides the basic charging characteristic to develop the sweep generator sawtooth signal output. The R-C network is part of the sweep generator but is separately shown for the purpose of illustration. When point 28 is grounded, the result is that the sweep generator 14 no longer generates a sawtooth waveform, the tone generator 24 will generate only a single fundamental frequency squarewave and the transmitter 18 will generate an r.f. signal with only a single tone, not the legislated 700 Hz swept tone. Consequently, by grounding point 28 and providing power to the overall ELT, the ELT can be tested without transmitting a false alarm.

Point 30 is simply a point at which the battery voltage can be measured. Point 32 is not a wired connection but rather a point at which r.f. energy from the transmitter can be measured while point 34 is a position in the ELT circuitry where an external ground can be provided to by-pass the switch 20 and apply power to the transmitter 18. Point 36 provides an access point to switch 20 whereby the switch, when latched, can be reset to the open position by the application of a predetermined signal. This means that an operator who determines that the ELT is generating false alarms can immediately and remotely disable the transmitter 18 be removing the ground from the transmitter. Access point 38 is the ELT ground that is connected to the ELT circuitry through switch 20, when closed, as well as connected to the interface circuitry (FIG. 2) and the RCM (FIG. 3).

Figure 2:
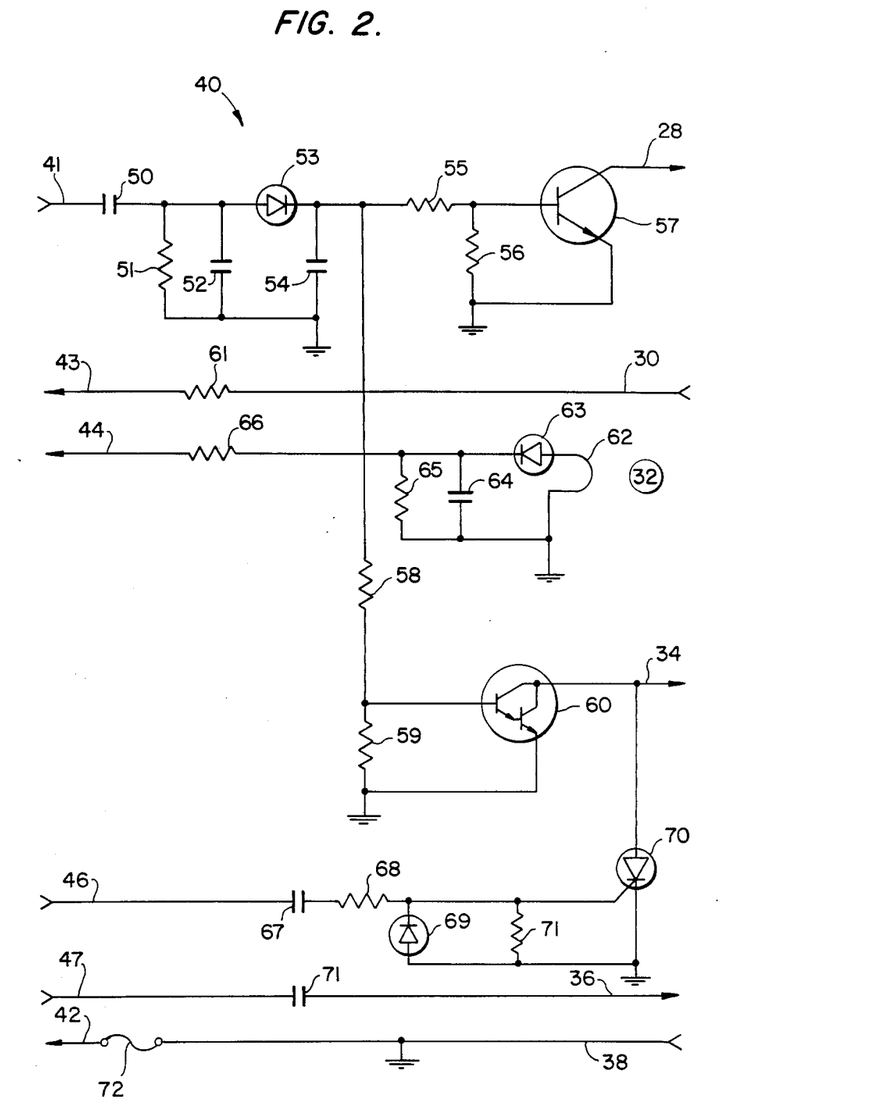
FIG. 2 is a circuit diagram for an interface circuit for connecting a standard ELT with a mechanically latched G-switch to a remote control monitor (RCM).
Figure 3:
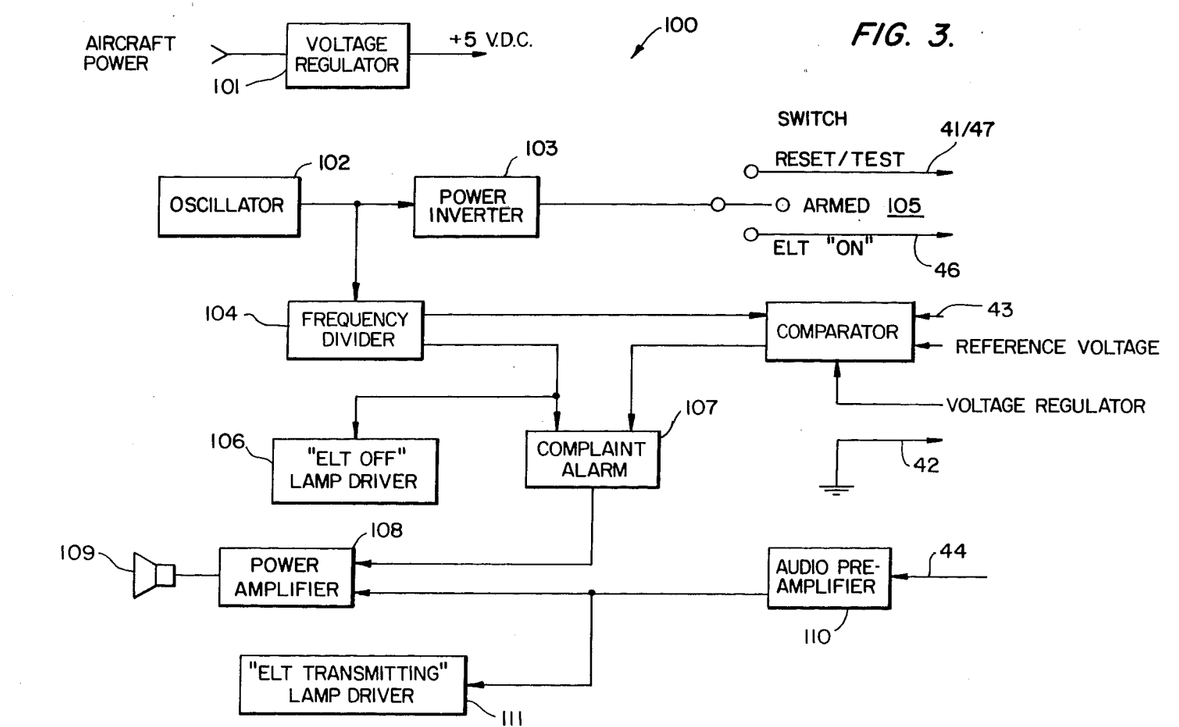
FIG. 3 is a block diagram of the RCM.

FIG. 2 is a schematic diagram for the essentially standard interface circuit or unit 40 which forms part of the invention. The purpose of the interface is fundamentally to provide an interconnect and buffer system between the ELT and the RCM which may be packaged with the ELT. The interface circuit, however, does more then simply interconnect the ELT and the RCM. Its design is such that if the RCM is not connected to the interface, the ELT will function in a traditional fashion. Further, the interface is designed so that if any or all of its inputs are shorted to ground, the aircraft power, or each other in any combination, the ELT operation will not be affected.

Point 41 is intended to receive a 6.5 KHz signal from the RCM when the ELT is being tested or reset which is converted by the circuitry provided to two ground signals at points 28 and 34. These ground signals disable the sweep generator 14 and turn on the transmitter 18 for testing and resetting. For this purpose the a.c. signal is passed through a 0.05 $\mu f$ capacitor 50 which provides the d.c. isolation necessary for reliability. Capacitor 50 connected to 10K $\Omega$ resistor 51 and a 0.001 $\mu f$ capacitor 52 which form a low-pass filter network to eliminate high frequency spikes that might unintentionally trigger the ELT. The output of the filter network is connected, in turn, to a 1N914 diode 53 which rectifies the a.c. signal. The rectified diode output is then applied to a 10 $\mu f$ capacitor 54 which acts as a filter and charges to a d.c. potential that is directed to two different transistor bias networks. The first bias network is formed by resistors 55 and 56, each of which is 10K $\Omega$, and controls 2N3904 transistor 57 (a general purpose NPN transistor), i.e., if a 6.5 KHZ signal is present at point 41, a positive d.c. voltage will appear at the junction of diode 53, capacitor 54, and resistor 55. This results in the application of a positive bias to the base of transistor 57, closing, or saturating transistor 57 in an "on" condition, grounding point 28 and disabling sweep generator 14 shown in FIG. 1. The positive potential built up on capacitor 54 when an a.c. signal is applied to capacitor 50 is also applied to resistor 58 which forms a resistor divider bias network with resistor 59 which, in turn, controls the current in transistor 60. When the bias at the interconnection of resistor 58 and resistor 59 is positive, transistor 60 turns "on" by closing in the saturated condition and applies a ground signal to point 34. Transistor 60 is typically a high gain Darlington pair. The grounding of point 34 causes the transmitter 18 of FIG. 1 to turn "on" and transmit an r.f. carrier signal. However, because the sweep generator is simultaneously grounded and disabled, the transmitted r.f. will not have a modulated audio sweep but, rather, a single modulation tone.

Point 43 supplies a heavily isolated sample of the ELT battery voltage to the RCM through resistor 61 which has a value of 100K $\Omega$. Resistor 61 is large enough to prevent the ELT battery from discharging in the event that point 43 is grounded, for example, in a crash. Resistor 61 is also large enough to prevent the battery from being damaged by charging should point 43 be shorted to the aircraft power.

Point 44 furnishes a detected sample of the ELT transmitted r.f. to the RCM. Coil 62 is a single turn pickup loop which senses radiated energy from transmitter 18 at point 32. In practice, the loop is placed in near proximity to the coils in the antenna matching network (not shown) of the transmitter. The single turn allows enough energy to be coupled into the anode of diode 63, a 1N914 diode, to generate a detected d.c. voltage at the diode cathode. The detected r.f. charges the 0.001 $\mu f$ capacitor 64 which is in parallel with 10K Ω resistor 65. Capacitor 64 and resistor 65 have a time constant which is set to detect the amplitude modulation that is superimposed on the r.f. signal. Accordingly, it will detect both the single tone amplitude modulation generated when the ELT is being tested and the sweep tone amplitude modulation when the unit is operating traditionally, whether as a false alarm, or otherwise. The detected signal is provided through the 10K Ω resistor 66 for the purpose of providing high impedance isolation prior to making the signal available to the RCM at point 44.

Point 46 of the interface unit represents the position at which the 6.5 KHz a.c. signal from the RCM may be applied to the ELT to turn the ELT "on". The signal is a.c. coupled by capacitor 67. A level change from ground to a sufficient positive voltage will cause a voltage spike to occur at the junction of the 1 μf capacitor 67 and the 1K Ω resistor 68 due to the differentiation action of this network. The voltage spike is limited by resistor 68 and applied to the cathode of the 1N914 diode 69 which protects the gate of the 2N5060 SCR 70, to which it is connected, from reverse voltages, by shorting the negative swing of the spike to ground. The 10K Ω resistor 71, connected across the diode 69 as well as to the gate and cathode of the SCR 70, forms part of the SCR bias network and functions to drain small amounts of leakage current from the gate of SCR. This prevents the SCR from turning itself "on" by internally generated currents. The anode of the SCR 70 is connected to point 34 which, in turn, is connected to the ground position for the ELT transmitter 18 (as well as the remainder of the ELT circuitry). Accordingly, when the 6.5 KHz signal is received from the RCM at point 46, the SCR 70 will be turned "on" which connects its anode and the transmitter 18 to ground, thereby turning the transmitter "on".

Point 47 receives the previously noted 6.5 KHz signal from the RCM whenever the RCM is switched to its reset/test position for the purpose of resetting the G-switch 20 to an "open" position and placing the ELT into its "armed" condition. The signal is directed to 1 μf capacitor 71, which provides its traditional a.c. coupling, d.c. blocking function, and is then coupled to point 36 and the G-switch. The mechanically latched G-switch contains a small heating element (not shown), which, when energized by the 6.5 KHz signal, flips the latch off and places the switch into the open position. The purpose of the capacitor 71 is to prevent a d.c. voltage from being accidentally applied to the G-switch and potentially destroying the switch.

The ground connection between the RCM and the ELT is provided by the wire connection between points 38 and 42. This connection is fused with ½ ampere fuse 72. The fuse is necessary to protect the inner wiring of the ELT from any damage should the ground wire of the RCM be inadvertently attached to the aircraft power supply during a crash sequence by opening the ground line.

A block diagram of the RCM 100 is shown in FIG. 3 with its inputs and outputs having designated connection point numbers that correspond, by number, to the respective points designated for the interface 40 to which the RCM is connected.

Aircraft engine power is applied to a 12V alternator or generator (not shown). The 12V output is, in turn, applied to a voltage regulator 101 whose output is a well regulated 5V d.c. This regulated 5V output is furnished to all RCM circuitry. As soon as the 5V output is available, oscillator 102, of conventional design, begins generating a 6.5 KHz signal which is applied to the inverter amplifier 103 as well as the divide by 128 digital frequency divider 104, both of which are also of conventional design. Inverter amplifier 103 functions as a buffer amplifier whose 6.5 KHz output is furnished to the three position switch 105 with "Reset/Test", "Arm" and "ELT On" positions. When switch 105 is placed in the Reset/Test position, the 6.5 KHz signal from inverter amplifier 103 is applied to points 41 and 47, and, as previously discussed, the sweep generator 14 is disabled, the ELT circuitry is grounded, transmitter 18 is turned "on", with a single tone, and the G-switch 20 is reset, i.e., the latch is released if it was in the latched position. This all occurs simultaneously.

In the event that switch 105 is placed in the "Armed" position, which is not connected to any interface circuitry, the ELT is placed in a ready to fire (normal) position where the sweep generator is not disabled and the transmitter could fire with swept audio amplitude modulation except that ELT circuitry is normally not grounded because the G-switch is open. Accordingly, the "Armed" position is the normal position assumed for flight, representing an ELT system condition where the ELT is ready to transmit when the G-switch is closed, i.e., in the event of a crash.

The ELT "On" position of switch 105 represents a position whereby the operator can turn the ELT "on" in its traditional sweep tone mode. In this switch position, the 6.5 KHz signal from the inverter 103 is applied to point 46, SCR 70 closes, i.e., its anode is placed at ground, and the transmitter 18 fires. In the "On" position, the sweep is not disabled. Of course, this switch position can be used as a test position, but if the operator is not in a distress situation, the operator is generating a false alarm signal that must be dealt with by those detecting the signal.

Comparator 112, described in more detail infra, has four inputs and a single output and a single function, that of determining whether the battery voltage is acceptable. The inputs are the battery sample itself from point 43, the voltage regulator output from voltage regulator 101, a 2.5V d.c. reference voltage derived from the regulator output for comparison with the sampled battery voltage and a 51 Hz audio signal obtained from the frequency divider 104. When the aircraft power is "on" and the regulator 101 output appears, the battery sample is connected to the comparator. The battery sample is digitally latched at the comparator output by the 51 Hz signal in one of two states depending on its relationship to the reference. The comparator output directly drives the inputs of the "ELT OFF" lamp driver 106. If the ELT battery voltage is low, the "ELT OFF" light in "ELT OFF" lamp driver 106 is turned "on" and the complaint alarm 107 is enabled. When the output of the comparator 112 is in an enabling state it switches the "ELT OFF" lamp driver 106 to an "on" condition which turns "on" a lamp, i.e., an LED, which, in turn, represents a battery "off" or battery "low" condition. At the same time, when the output of comparator 112 is enabling, the complaint alarm is enabled, which means that it inputs the 3.25 KHz signal from frequency divider 104 and its outputs a 1.6 KHz audio signal by counting down by 2. This 1.6 KHz output drives one input of power amplifier 108 which, in turn, drives speaker 109. The power amplifier 108 is simply comprised of two field effect transistors (FETs). One input of the amplifier is coupled to the gate of one FET and the output of complaint alarm 107. The other input is coupled to the gate of the other FET and the output of preamplifier 110. The outputs of the FETs, connected in common, comprise the output of amplifier 108 and are coupled to a common speaker. In this instance, the 1.6 KHz output from complaint alarm 107 drives its associated FET from saturation to cut-off. This means that at the same time as the lamp of driver 106 is lit, an audio signal is sounded to indicate that the ELT battery is low.

If the transmitter is operating, either in its sweep disabled or traditional swept mode, the detected r.f., i.e., the square wave modulation on the r.f., at point 44, is applied to the audio preamplifier 110 which is simply two cascaded operational amplifiers. The design of the preamplifier is not critical. In the design of choice, the amplifier has a very low offset voltage ($\leq 5$ mv), low power consumption ($\leq 75$ mw), and a 1 MHz unity gain. The square wave output of the preamplifier drives the second input of the power amplifier 108 to drive the speaker 109. Thus, the speaker audio notifies the pilot in the event that the battery is low, that the ELT is being tested in the sweep disabled mode or, alternatively, that the ELT is transmitting its traditional distress signal. The audio tones generated, however, will be different for each condition. At the same time that the preamplifier 110 is driving power amplifier 109 it is also driving the "ELT Transmitting" lamp driver 111. When modulated r.f. is detected, the light emitting diode in driver 111 is lit. The design of lamp driver 111 is the same as lamp driver 106. It is simply a FET which is switched between cut-off and saturation with a light emitting diode as a load. Again, when the diode is lit, the indication is that there is modulated r.f. present. There is no indication as to the nature of the modulation.

All circuitry of the RCM, as set forth in the system, block diagram format of FIG. 3, is deemed to be of conventional design. The design of each functional block is non-critical. For the purpose of clarity, however, a more detailed design for comparator 112 and complaint alarm 107 is provided in FIG. 4. The comparator 112 includes relay 201, resistor dividers $R_1$, $R_2$ and $R_3$, $R_4$, operational amplifier 203 and flip-flop 205. When the voltage regulator is "on", its 5VDC output energizes and closes relay 201, connecting the sampled battery voltage from point 43 of the interface unit (FIG. 2) to resistance divider $R_1$, $R_2$, $R_1$ being equal to $R_2$. Accordingly, one-half the battery sample, i.e., the voltage at point 43, is applied to the "plus" input of operational amplifier 203. At the same time, i.e., when the voltage regulator is "on", its 5VDC output is applied to voltage divider $R_3$, $R_4$, $R_3$ being equal to $R_4$. Accordingly, a 2.5VDC reference voltage is always applied to the "minus" input of operational amplifier 203. The operational amplifier gain is made so great that its output works between its limits whenever there is a slight difference between its voltage inputs. In other words, when the divided battery sample is greater than the reference voltage, the operational amplifier output is at its low limit and when the divided battery sample is low compared to the reference voltage, the amplifier output is at its high limit. Therefore, flip-flop 205, in effect, sees a digital signal at its D input which represents battery condition. In this instance, when the digital input at D is low (+0.6V), the battery condition is considered unacceptable. Alternatively, when the D input is high (+3.5V), the battery condition is considered acceptable.

Flip-flop 205 is a D-type (delay) flip-flop which is conventionally employed, i.e., the input appears at the Q output, delayed by the clock pulse. The clock pulse is the 51 Hz signal applied to the C input of flip-flop 205 derived from one of the two outputs of the frequency divider 104 depicted in FIG. 3. Accordingly, when the D input is high, this is considered, for the flip-flop configuration employed, to be the absence of a signal and the $\overline{Q}$ output is at ground. In turn, the "LED OFF" lamp driver 106 FIG. 3, is cut-off and its LED is "off". When the D input is low, the 51 Hz signal causes Q to assume its low state and $\overline{Q}$ to assume its high state. This high signal switches the lamp driver 106 "on" which turns its LED "on", indicating a low battery warning. The "truth-table" for flip-flop 205 is as follows:

| D | C | Q | ELT "OFF" LAMP DRIVER 106 |
|---|---|---|---|
| high (battery "OK") | 51 Hz | low | disabled (LED "off") |
| low (battery "low") | 51 Hz | high | enabled (LED lit) |

Figure 4:
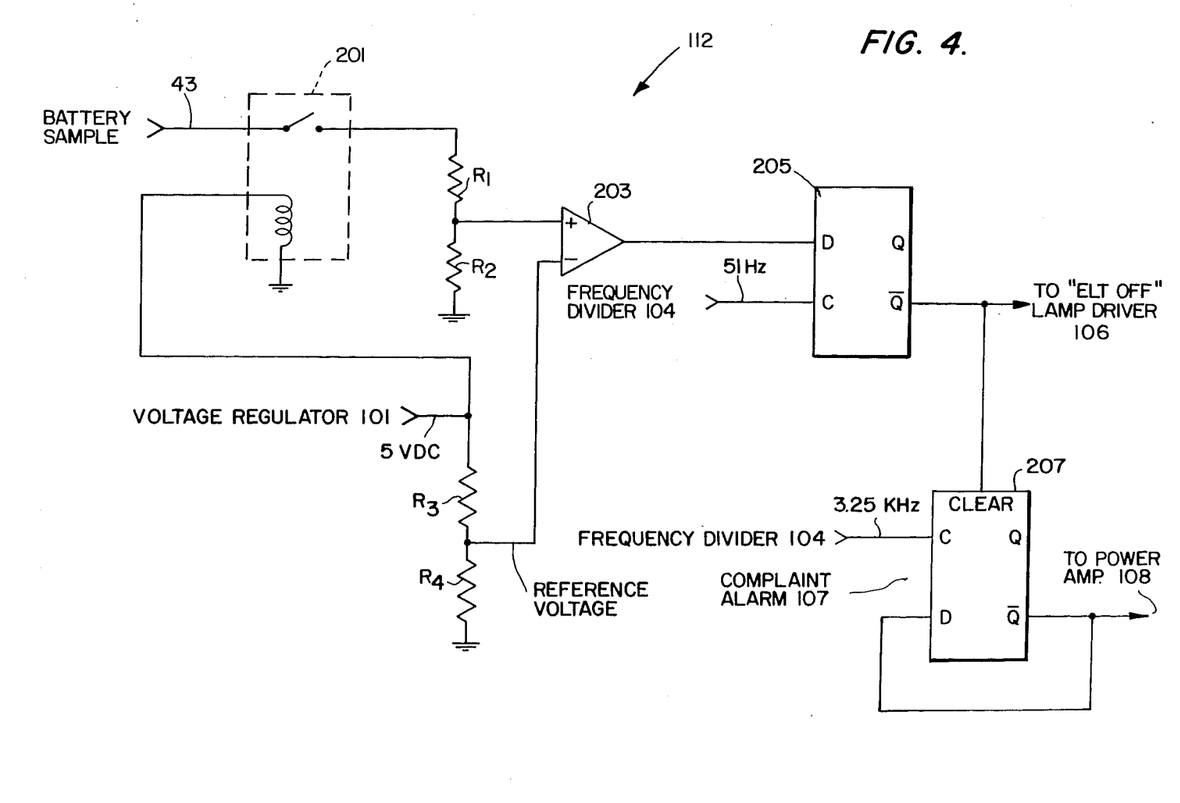
FIG. 4 is a circuit diagram of a portion of the RCM.

As shown in FIG. 4, the output $\overline{Q}$ of flip-flop 205 not only drives lamp driver 106 but also the "clear" input of D-type flip-flop 207. Flip-flop 207, in the configuration shown, by itself constitutes complaint alarm 107, FIG. 3. Here, the D input is tied to the $\overline{Q}$ input, which drives power amplifier 108, shown in FIG. 3. The C input is driven by the 3.25 KHz output of frequency divider 104, also shown in FIG. 3. When the "clear" input is low, the $\overline{Q}$ output is low. When the "clear" input is high the "clear" function is inhibited, allowing complaint alarm 107 to toggle at 1.6 KHz. The 3.25 KHz input to C appears at the $\overline{Q}$ output as a 1.6 KHz signal. When this signal is applied to the power amplifier 108, the signal indirectly drives speaker 109 in the audio range. Thus, a high level signal from the $\overline{Q}$ output of flip-flop 205, in effect, acts as a gate for an audio warning signal at speaker 109 as well as for the LED visual warning signal for the lamp driver 106. The "truth table" for complaint alarm 107 may be designated as:

| CLEAR | C | D & Q |
|---|---|---|
| low | 3.25 KHz | low |
| high | 3.25 KHz | 1.6 KHz |

While the ELTs are standard in terms of their distress signal and their circuitry is somewhat standard, the greatest variation between ELTs, with respect to their design, is that some are electrically latched rather than mechanically latched. In the case of the electrically latched design, the G-switch, once activated, drives an SCR, located in the ELT transmitter, into conduction. This action completes the ground connection and allows for transmission of a distress signal. For the instant invention to perform its intended functions for electrically latched ELTs, the interface unit described in FIG. 2 must be somewhat modified as shown in the interface unit 40 of FIG. 5. No modifications are required to the ELT (FIG. 1) or RCM (FIG. 3).

Figure 5:
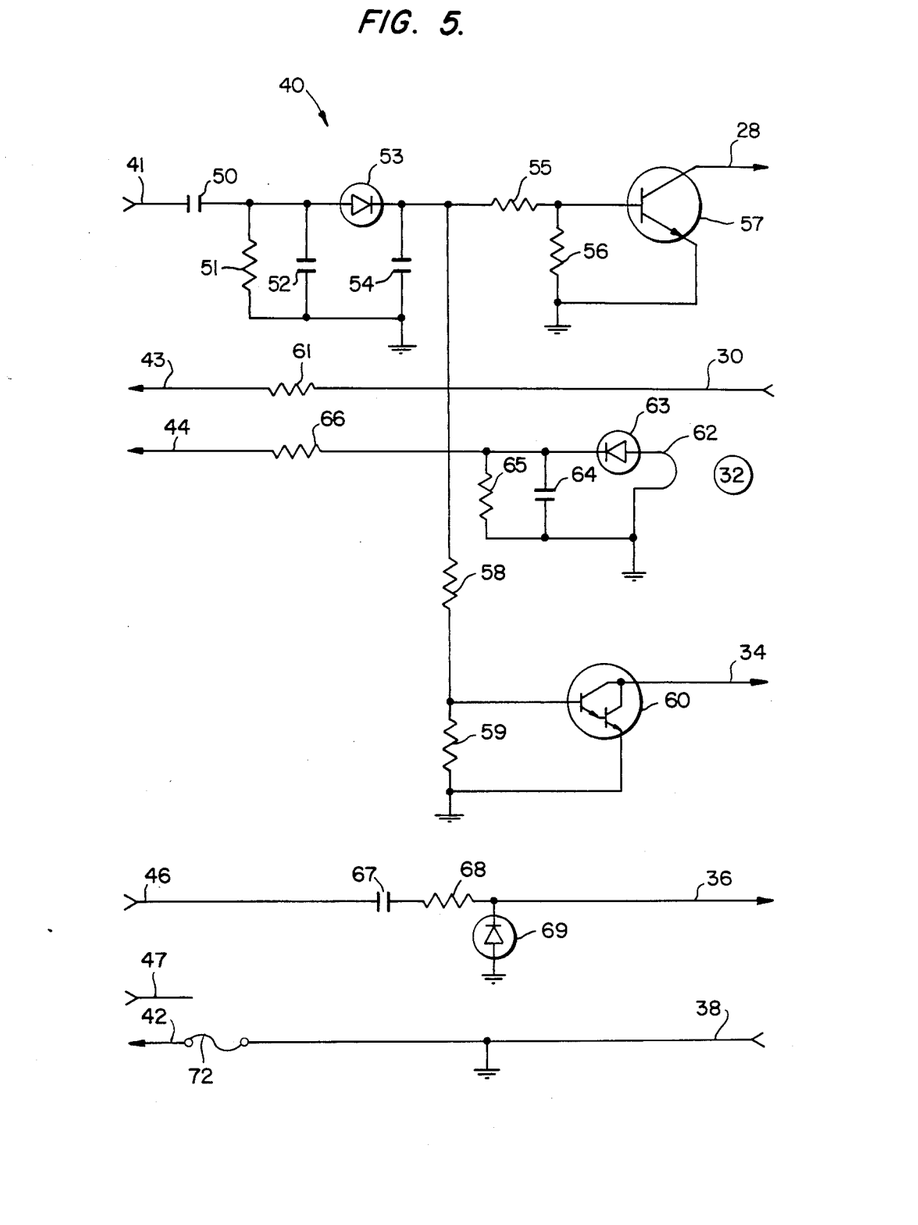
FIG. 5 is a circuit diagram of an interface circuit for connecting a standard ELT with an electrically latched G-switch to an RCM.

The circuitry in FIGS. 2 and 5 are identical in most respects. Between point 41 of the interface and points 28 (FIG. 5) and 34 of the ELT (FIG. 1) the circuit is the same with the function of taking the 6.5 KHz signal from the RCM switch 105 (FIG. 3), when placed in the Reset/Test position, to disable the ELT sweep generator 14 and provide a ground for the ELT. Similarly, the interface circuits for furnishing the battery sample to the RCM from point 30 of the ELT through point 43 of the interface and for furnishing the detected r.f. output to the RCM from point 32 of the ELT through point 44 of the interface, are identical in FIGS. 2 and 5, i.e., for both the mechanically and electrically latched ELTs. The interface ground connection is also identical, connecting point 38, the ELT system ground, through point 42 of the interface unit, to the RCM system ground. It is only the latching arrangement in the two interface units, that is different. Firstly, point 47 of the interface for the mechanically latched ELT (FIG. 2) carries the 6.5 KHz signal from the RCM switch 105 when the switch placed in the Reset/Test position to connect the interface to point 36 of the ELT G-switch detent. In the electrically latched ELT there is no detent. Accordingly, point 47, in the case of the interface unit for the electrically latched G-switch, is left open, i.e, not connected to the ELT. Secondly, for the electrically latched ELT design, SCR 70 and its associated leakage resistor 71 are not present in the interface circuit connecting point 46 to the RCM switch 105, ELT "on" position. This is simply because the SCR and leakage resistor are built into the ELT (not shown) and constitute the electrical latch. The junction between resistor 68 and the cathode of diode 69, in the interface, is connected to point 36 and connected to the SCR gate (not shown). In a fashion similar to the mechanically latched ELT, when switch 105 (FIG. 3) is placed in the ELT "on" position, the 6.5 KHz square-wave signal is differentiated by the FIG. 5 network comprised of capacitor 67 and the resistor 68 with the negative spike shorted to ground by diode 69. The positive spike drives ELT point 36 and drives the internal SCR into conduction. This grounds the ELT circuitry and turns the ELT "on". This slightly modified interface for the electrically latched ELT design, depicted in FIG. 5, is, like the interface for the mechanically latched design (FIG. 2), integrated with the ELT package. Its design allows for the use of identical RCMs, with identical functions and connections, regardless of the type of latching employed in the ELT.

When an EPIRB rather than an ELT is employed aboard ship, the interface and RCM designs are essentially the same. They would be simplified, however, because no G-switch is present. Accordingly, there is no provision for turning the transmitter "on" through the G-switch or arming the transmission by disabling a latching mechanism.

I claim:

1. A distress signal transmitting system located within a vehicular body comprising a distress transmitter at one position of said body and a control monitor at another position within said body which is convenient to an operator and remote from said transmitter, said transmitter being electrically connected to said control monitor and having means for providing operating condition alternatives of transmission with sweep frequency modulation, transmission that is distinguishable from said transmission with sweep frequency modulation, or non-transmission, and said control monitor having means for indicating said transmitter operating condition.

2. The distress signal transmitting system of claim 1 wherein said distinguishable transmission has single frequency modulation.

3. The distress signal transmitting system of claim 1 wherein said means for indicating transmitter operation condition includes visual means.

4. The distress signal transmitting system of claim 1 wherein said means for indicating transmitter operating condition includes audio means.

5. The distress signal transmitting system of claim 1 wherein said means for indicating transmitter operating condition includes both visual and audio means.

6. The distress signal transmitting system of claim 5 wherein said visual and audio means includes an LED and a speaker.

7. The distress signal transmitting system of claim 1 wherein said means to indicate transmitter operating condition includes means to indicate said distinguishable transmission or said transmission with sweep frequency modulation.

8. The distress signal transmitting system of claim 7 wherein said means to indicate said distinguishable transmission or said transmission with sweep frequency modulation includes audio means.

9. The distress signal transmitting system of claim 8 wherein said audio means is a speaker.

10. The distress signal transmitting system of claim 1 wherein said monitor has additional means to control transmitter operating condition.

11. A distress signal transmitting system located within a vehicular body comprising a distress transmitter at one position of said body and a control monitor at another position within said body which is convenient to an operator and remote from said transmitter, said transmitter being electrically connected to said control monitor and having means for providing operating condition alternatives of transmission with sweep frequency modulation, transmission that is distinguishable from said transmission with sweep frequency modulation, and said control monitor having means to control said operating condition alternatives.

12. The distress signal transmitting system of claim 11 wherein said transmitter operating condition alternatives include said transmission with sweep frequently modulation, said distinguishable transmission, and non-transmission.

13. The distress signal transmitting system of claim 11 wherein said control monitor includes further means to reset said transmitter to an arm condition, said resetting means including means to place a G-switch in an open position.

14. The distress signal transmitting system of claim 11 wherein said control monitor has additional means to indicate transmitter operation.

15. The distress signal transmitting system of claim 11 wherein said distinguishable transmission has single frequency modulation.

16. A distress signal transmitting system located within a vehicular body comprising a distress transmitter at one position of said body and a control monitor at another position within said body which is convenient to an operator and remote from said transmitter, said transmitter being electrically connected to said control monitor by an interface unit including a multi-wire cable, said interface unit including means to protect said transmitter from disablement in the event said cable is damaged.

17. The distress signal transmitting system of claim 16 wherein said means to protect said transmitter from disablement includes a.c. driven, capacitor coupled circuitry within said interface unit.

* * * * *